(12) United States Patent
Kawaguchi

(10) Patent No.: US 9,821,408 B2
(45) Date of Patent: Nov. 21, 2017

(54) LASER MACHINING METHOD AND LASER MACHINING DEVICE

(75) Inventor: Daisuke Kawaguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/344,731

(22) PCT Filed: Sep. 13, 2012

(86) PCT No.: PCT/JP2012/073499
§ 371 (c)(1),
(2), (4) Date: Mar. 13, 2014

(87) PCT Pub. No.: WO2013/039162
PCT Pub. Date: Mar. 21, 2013

(65) Prior Publication Data
US 2014/0251963 A1    Sep. 11, 2014

(30) Foreign Application Priority Data

Sep. 16, 2011   (JP) .................................. 2011-203390

(51) Int. Cl.
*B23K 26/06*   (2014.01)
*B23K 26/00*   (2014.01)
*B23K 26/08*   (2014.01)
*B23K 103/00*   (2006.01)

(52) U.S. Cl.
CPC ...... *B23K 26/0665* (2013.01); *B23K 26/0006* (2013.01); *B23K 26/0057* (2013.01); *B23K 26/08* (2013.01); *B23K 2203/56* (2015.10)

(58) Field of Classification Search
CPC  B23K 26/0042; B23K 26/08; B23K 26/0665; B23K 26/0057
USPC ..... 219/69.1, 121.6, 121.67, 121.69, 121.72; 438/462, 463
See application file for complete search history.

(56) References Cited

U.S. PATENT DOCUMENTS

| | | | | |
|---|---|---|---|---|
| 2009/0302428 A1* | 12/2009 | Sakamoto | .......... | B23K 26/0057 257/620 |
| 2011/0000897 A1* | 1/2011 | Nakano | .............. | B23K 26/0057 219/121.72 |
| 2011/0244659 A1* | 10/2011 | Wang | ...................... | H01L 21/78 438/463 |
| 2011/0298084 A1* | 12/2011 | Tamemoto | .......... | B23K 26/0057 257/507 |

(Continued)

FOREIGN PATENT DOCUMENTS

| | | |
|---|---|---|
| CN | 102317030 A | 1/2012 |
| JP | 2005-288503 A | 10/2005 |
| JP | 2006-108459 A | 4/2006 |

(Continued)

*Primary Examiner* — Thien S Tran
(74) *Attorney, Agent, or Firm* — Drinker Biddle & Reath LLP

(57) ABSTRACT

Laser light L is converged at an object to be processed 1, so as to form a modified region 7 including a modified spot S in the object 1. At this time, the laser light L is converged at a front face 3 of the object 1 while an aberration of the laser light L is corrected such as to locate a converging point of the laser light L near the front face 3 serving as a laser light entrance surface, so as to form a second modified spot $S_2$ exposed at the front face 3 in the object 1.

7 Claims, 14 Drawing Sheets

(56) References Cited

U.S. PATENT DOCUMENTS

2012/0223061 A1* 9/2012 Atsumi ............. B23K 26/0057
219/121.72

FOREIGN PATENT DOCUMENTS

| | | | |
|---|---|---|---|
| JP | 2007-260749 A | 10/2007 | |
| JP | 2010-000542 A | 1/2010 | |
| JP | EP 2186596 A1 * | 5/2010 | ......... B23K 26/0057 |
| JP | WO 2011030802 A1 * | 3/2011 | ......... B23K 26/0057 |
| JP | 2011-131256 A | 7/2011 | |
| TW | 201127536 A | 8/2011 | |
| WO | WO 2010/064997 * | 6/2010 | |
| WO | WO-2010/098186 A1 | 9/2010 | |
| WO | WO-2010/116917 A1 | 10/2010 | |

* cited by examiner

Fig.11
(a)
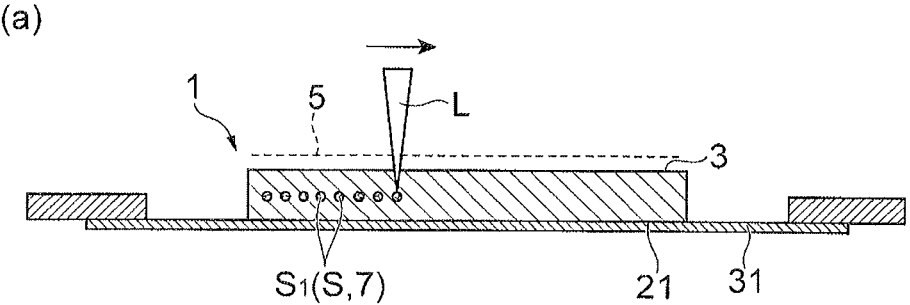
(b)
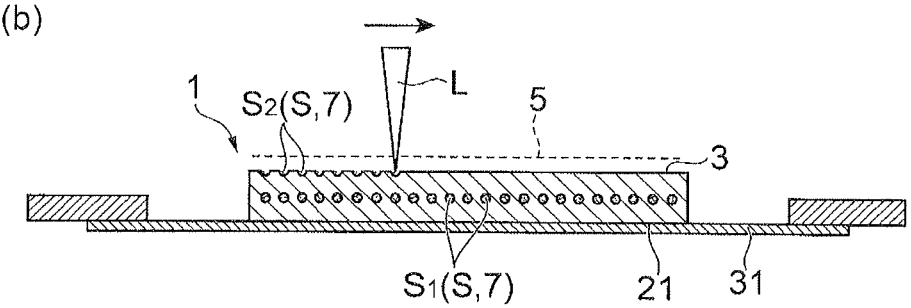

*Fig.12*
(a)
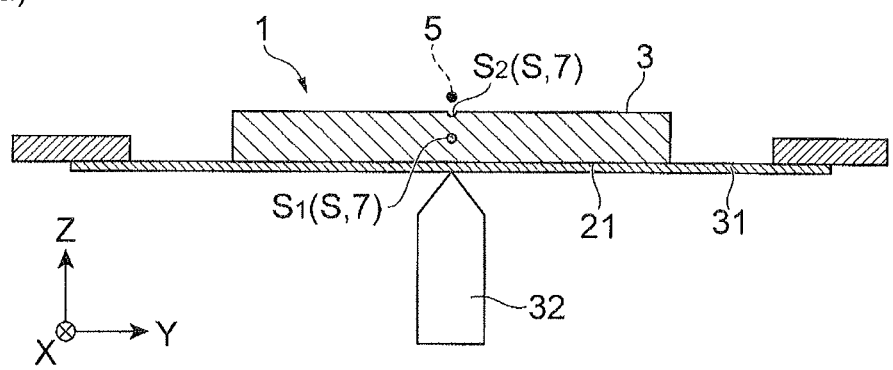
(b)
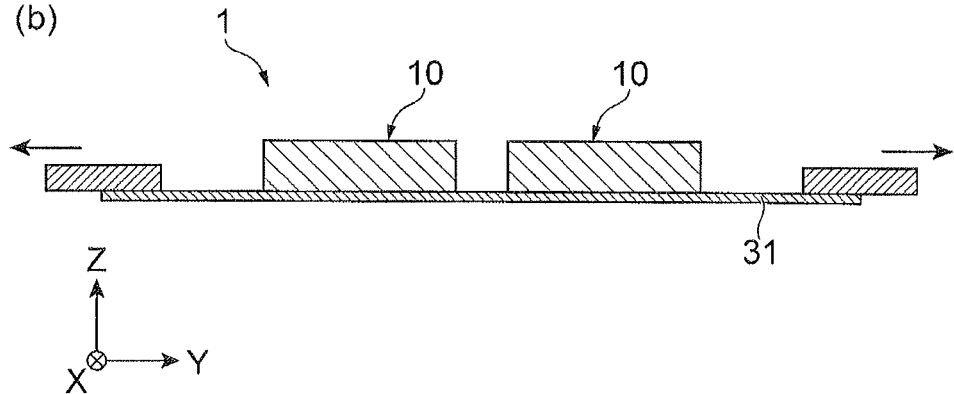

Fig.13
(a)
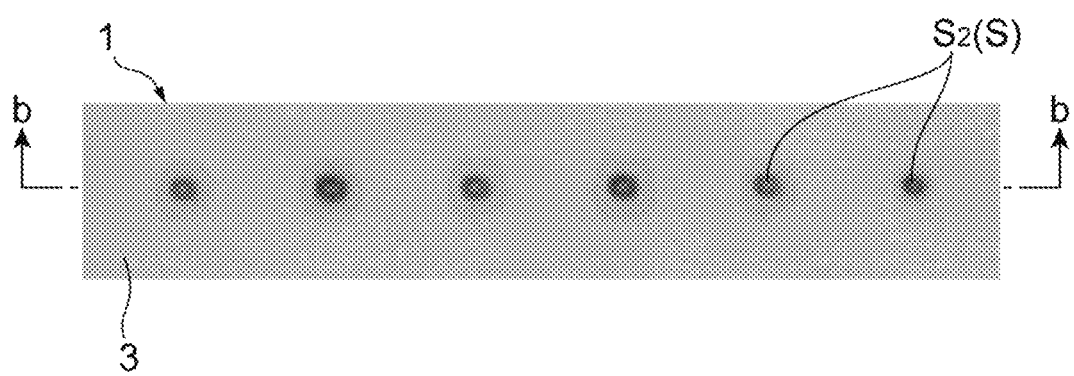
(b)
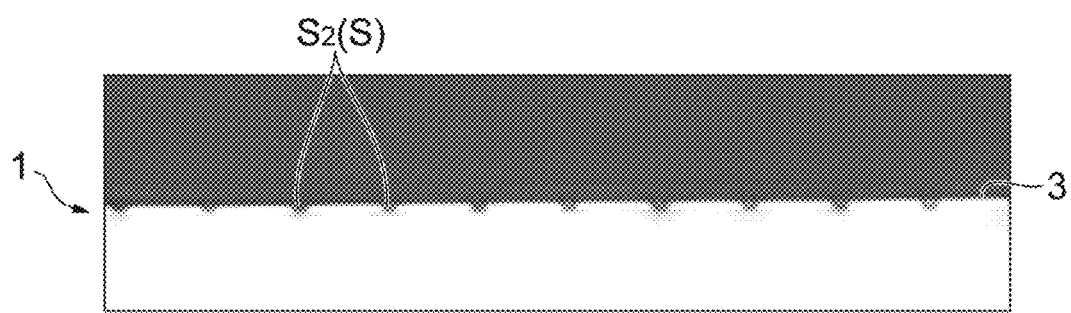

LASER MACHINING METHOD AND LASER MACHINING DEVICE

TECHNICAL FIELD

The present invention relates to a laser processing method and device for forming a modified region including a modified spot in an object to be processed.

BACKGROUND ART

Known as a conventional laser processing method is one converging laser light at an object to be processed, so as to form a modified region in the object along a line to cut (see, for example, Patent Literature 1). Such a laser processing method forms a plurality of modified spots along the line and lets the plurality of modified spots produce the modified region.

CITATION LIST

Patent Literature

Patent Literature 1: Japanese Patent Application Laid-Open No. 2006-108459

SUMMARY OF INVENTION

Technical Problem

In the laser processing method such as the one mentioned above, a phenomenon (so-called airshot phenomenon) in which no modified spot is formed when the laser light is converged at the object may occur in some cases, whereby modified spots may not be formed accurately.

It is therefore an object of the present invention to provide a laser processing method and device which can accurately form a modified spot in the object.

Solution to Problem

For achieving the above-mentioned object, the inventor conducted diligent studies and, as a result, has found that, when forming a modified spot exposed at a laser light entrance surface in the object, correcting the aberration of the laser light such as to locate a converging point near the laser light entrance surface within the object instead of simply converging the laser light at the laser light entrance surface can restrain the so-called airshot phenomenon from occurring, thus achieving the present invention. By near the laser light entrance surface within the object is meant a region within 10% of the thickness of the object from the laser light entrance surface, more preferably a region at a distance of 10 μm or less from the laser light entrance surface regardless of the thickness of the object.

That is, the laser processing method in accordance with one aspect of the present invention is a laser processing method for forming a modified region including a modified spot in an object to be processed by converging a laser light at the object, the method comprising the step of forming the modified spot exposed at a laser light entrance surface in the object by converging the laser light at the laser light entrance surface of the object while correcting an aberration of the laser light such as to locate a converging point of the laser light near the laser light entrance surface within the object.

This laser processing method can restrain the so-called airshot phenomenon from occurring as mentioned above, thus making it possible to form the modified spot accurately in the object.

The object may be formed from quartz, and the step of forming the modified spot may converge the laser light at the laser light entrance surface of the object while correcting the aberration of the laser light such as to locate the converging point at a position 1 to 2 μm inside of the laser light entrance surface in the object. This can form the modified spot accurately in the object when the object is formed from quartz.

The step of forming the modified spot may form a plurality of modified spots along a line to cut by relatively moving the laser light along the line while irradiating the object therewith. In this case, the method may further comprise a cutting step of cutting the object along the line from the modified region acting as a cutting start point. This can accurately cut the object.

The laser processing device in accordance with one aspect of the present invention is a laser processing device for forming a modified region including a modified spot in an object to be processed by converging a laser light at the object, the device comprising a laser light source for oscillating the laser light in a pulsating manner, a condenser optical system for converging the laser light oscillated by the laser light source into the object on a support table, a spatial light modulator for correcting an aberration of the laser light, and a control unit for controlling at least the laser light source and the spatial light modulator; the control unit executing a process of forming the modified spot exposed at a laser light entrance surface in the object by displaying a predetermined aberration correction pattern on a liquid crystal layer of the spatial light modulator and converging the laser light at the laser light entrance surface of the object while correcting the aberration of the laser light such as to locate a converging point of the laser light near the laser light entrance surface within the object.

This laser processing device can also restrain the so-called airshot phenomenon from occurring, thus making it possible to form the modified spot accurately in the object.

Advantageous Effects of Invention

The present invention can accurately form the modified spot in the object.

BRIEF DESCRIPTION OF DRAWINGS

FIG. 11 is a set of schematic diagrams for explaining a step of cutting the object into quartz chips;

FIG. 12 is another set of schematic diagrams for explaining the step of cutting the object into quartz chips;

FIG. 13(a) is a photograph illustrating the front face of the object formed with second modified spots in accordance with the embodiment, while FIG. 13(b) is a photograph corresponding to a cross section taken along the line b-b of FIG. 13(a)

DESCRIPTION OF EMBODIMENTS

In the following, a preferred embodiment of the present invention will be explained in detail with reference to the drawings. In the following explanation, the same or equivalent constituents will be referred to with the same signs while omitting their overlapping descriptions.

The laser processing method in accordance with the embodiment converges laser light at an object to be processed, so as to form a modified region including a modified spot along a line to cut. Therefore, the forming of the modified region will be explained at first with reference to FIGS. 1 to 6.

Figure 1:
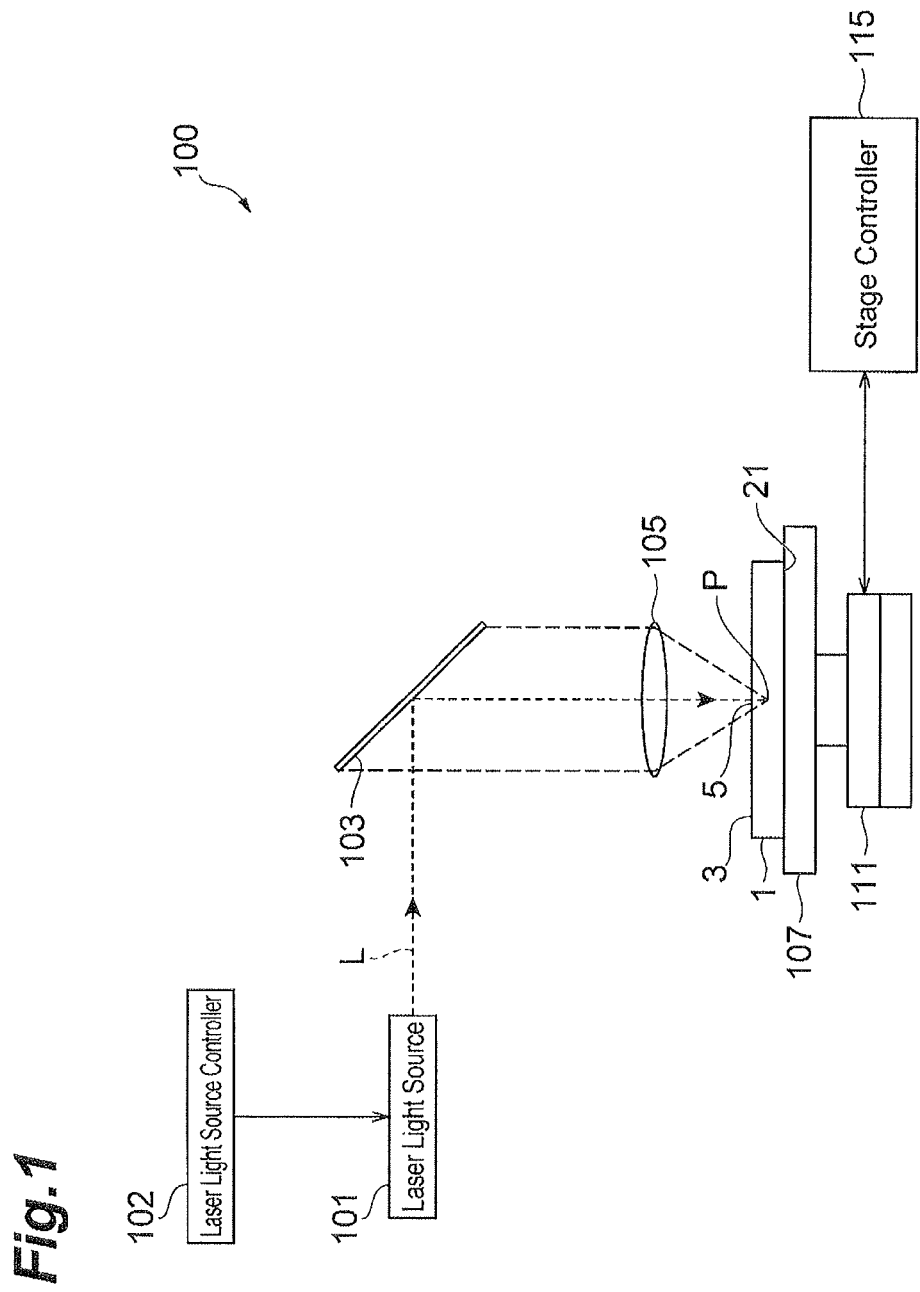
FIG. 1 is a schematic structural diagram of a laser processing device used for forming a modified region.

As illustrated in FIG. 1, a laser processing device 100 comprises a laser light source 101 for causing laser light L to oscillate in a pulsating manner, a dichroic mirror 103 arranged such as to change the direction of the optical axis (optical path) of the laser light L by 90°, and a condenser lens (condenser optical system) 105 for converging the laser light L. The laser processing device 100 further comprises a support table 107 for supporting an object to be processed 1 which is irradiated with the laser light L converged by the condenser lens 105, a stage 111 for moving the support table 107, a laser light source controller 102 for regulating the laser light source 101 in order to adjust the output, pulse width, pulse waveform, and the like of the laser light L, and a stage controller 115 for regulating the movement of the stage 111.

In the laser processing device 100, the laser light L emitted from the laser light source 101 changes the direction of its optical axis by 90° with the dichroic mirror 103 and then is converged by the condenser lens 105 into the object 1 mounted on the support table 107. At the same time, the stage 111 is shifted, so that the object 1 moves relative to the laser light L along a line to cut 5. This forms a modified region in the object 1 along the line 5. Though the stage 111 is shifted in order to move the laser light L relatively here, the condenser lens 105 may be moved instead thereof or in addition thereto.

Figure 2:
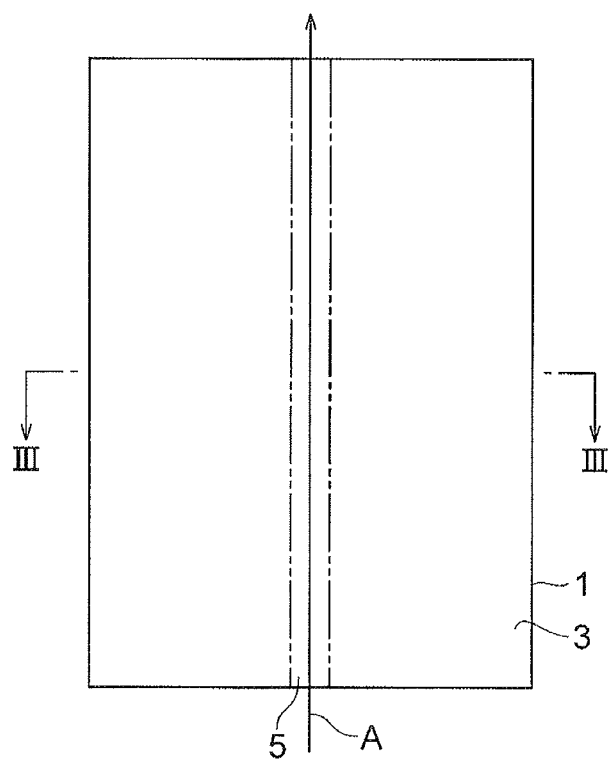
FIG. 2 is a plan view of an object to be processed for which the modified region is formed.
Figure 3:
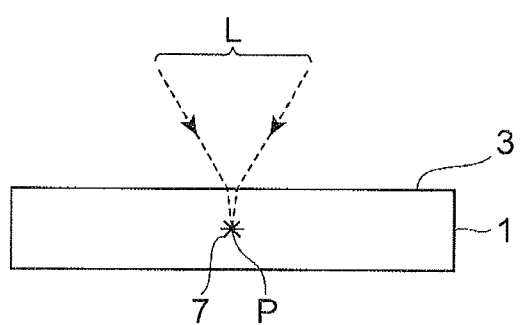
FIG. 3 is a sectional view of the object taken along the line III-III of FIG. 2.
Figure 4:
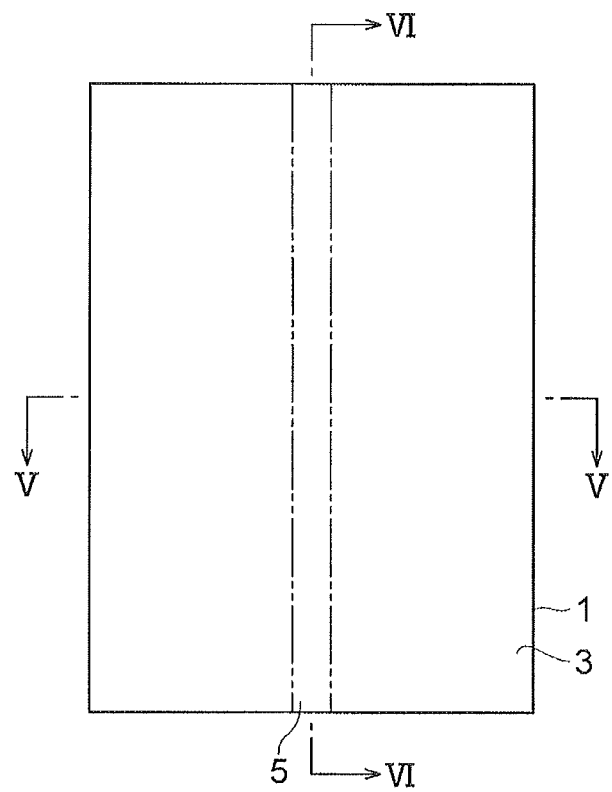
FIG. 4 is a plan view of the object after laser processing.
Figure 5:
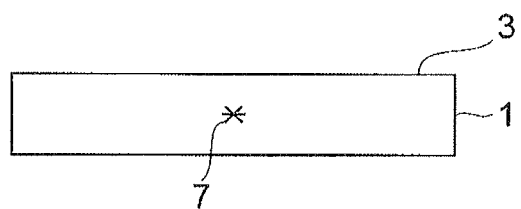
FIG. 5 is a sectional view of the object taken along the line V-V of FIG. 4.
Figure 6:
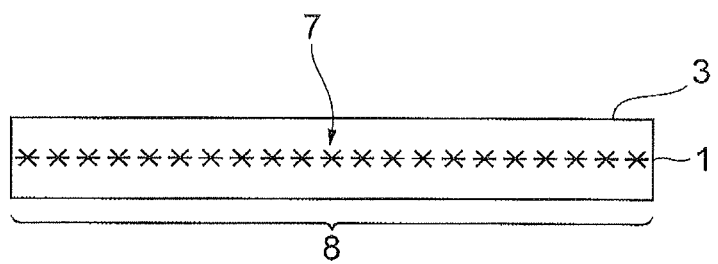
FIG. 6 is a sectional view of the object taken along the line VI-VI of FIG. 4.

In the object 1, for which a semiconductor material, a dielectric material, or the like is used, the line 5 as a line to form a modified region for forming the modified region is set as illustrated in FIG. 2. The line 5, which is used for cutting the object 1, is a virtual line extending straight. When forming a modified region within the object 1, the laser light L is relatively moved along the line 5 (i.e., in the direction of arrow A in FIG. 2) while locating a converging point (converging position) P within the object 1 as illustrated in FIG. 3. This forms a modified region 7 within the object 1 along the line 5 as illustrated in FIGS. 4 to 6, whereby the modified region 7 formed along the line 5 becomes a cutting start region 8.

The converging point P is a position at which the laser light L is converged. The line 5 may be curved instead of being straight, a three-dimensional combination of lines and curves, or one specified with coordinates. The line 5 may be one actually drawn on a front face 3 of the object 1 without being restricted to the virtual line. The modified region 7 may be formed either continuously or intermittently. The modified region 7 may be formed either in rows or dots, and it is only necessary for the modified region 7 to be formed at least within the object 1. There are cases where fractures are formed from the modified region 7 acting as a start point, and the fractures and modified region 7 may be exposed at outer surfaces (the front face 3, rear face 21, and outer peripheral surface) of the object 1. The laser light entrance surface for forming the modified region 7 is not limited to the front face 3 of the object 1, but may be the rear face 21 of the object 1.

Here, the laser light L is absorbed in particular in the vicinity of the converging point within the object 1 while being transmitted therethrough, whereby the modified region 7 is formed in the object 1 (internal absorption type laser processing). Therefore, the front face 3 of the object 1 hardly absorbs the laser light L and thus does not melt. In the case of forming a removing part such as a hole or groove by melting it away from the front face 3 (surface absorption type laser processing), the processing region gradually progresses from the front face 3 side to the rear face side in general.

By the modified region formed in this embodiment are meant regions whose physical characteristics such as density, refractive index, and mechanical strength have attained states different from those of their surroundings. Examples of the modified region include molten processed regions (meaning at least one of a region resolidified after melting, a region in a melted state, and a region in the process of resolidifying from the melted state), crack regions, dielectric breakdown regions, refractive index changed regions, and their mixed regions. Other examples of the modified region include areas where the density of the modified region has changed from that of an unmodified region and areas formed with a lattice defect in a material of the object (which may also collectively be referred to as high-density transitional regions).

The molten processed regions, refractive index changed regions, areas where the modified region has a density different from that of the unmodified region, or areas formed with a lattice defect may further incorporate a fracture (fissure or microcrack) therewithin or at an interface between the modified and unmodified regions. The incorporated fracture may be formed over the whole surface of the modified region or in only a part or a plurality of parts thereof. Examples of the object 1 include those containing or constituted by silicon, glass, LiTaO$_3$ or sapphire (Al$_2$O$_3$), and quartz (SiO$_2$).

This embodiment forms a plurality of modified spots (processing scars) along the line 5, thereby producing the modified region 7. The modified spots, each of which is a modified part formed by a shot of one pulse of pulsed laser light (i.e., one pulse of laser irradiation; laser shot), gather to yield the modified region 7. Examples of the modified spots include crack spots, molten processed spots, refractive index changed spots, and those in which at least one of them is mixed.

Preferably, for the modified spots, their sizes and lengths of fractures generated therefrom are controlled as appropriate in view of the required cutting accuracy, the demanded flatness of cut surfaces, the thickness, kind, and crystal orientation of the object, and the like.

The laser processing device in accordance with the embodiment will now be explained.

Figure 7:
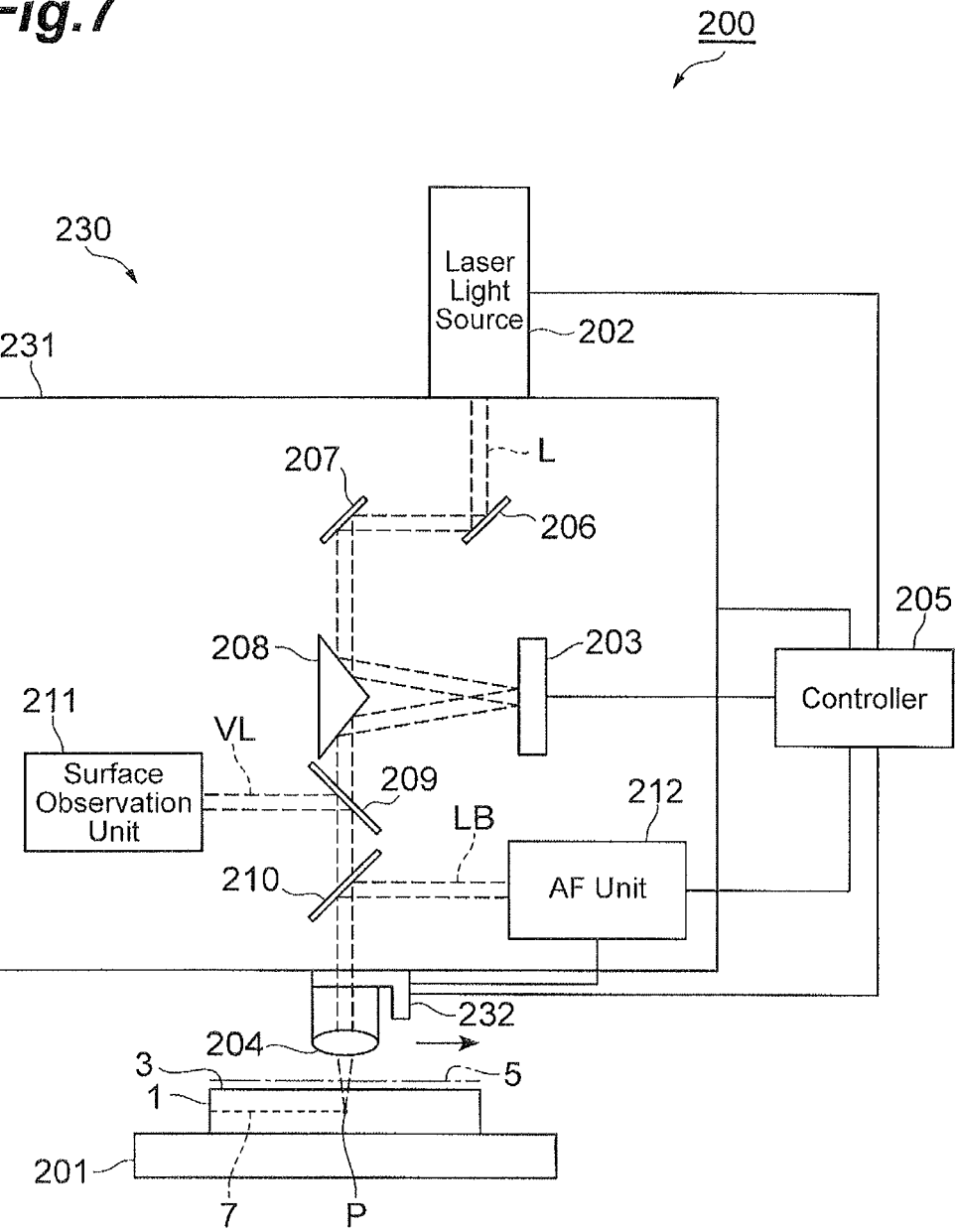
FIG. 7 is a schematic structural diagram of a laser processing device in accordance with an embodiment.

As FIG. 7 illustrates, this laser processing device 200 comprises a support table 201 for supporting the planar object 1, a laser light source 202 for emitting the laser light L, a reflective spatial light modulator 203 for correcting the aberration of the laser light L emitted from the laser light source 202, a condenser optical system 204 for converging the laser light L whose aberration is corrected by the reflective spatial light modulator 203 into the object 1 supported by the support table 201, and a controller (control unit) 205 for controlling at least the reflective spatial light modulator 203. The laser processing device 200 irradiates the object 1 with the laser light L, so as to form the modified region 7 including a plurality of modified spots along the line 5 in the object 1.

The reflective spatial modulator 203 is installed within a housing 231, while the laser light source 202 is installed on a top plate of the housing 231. The condenser optical system 204 includes a plurality of lenses and is installed on a bottom plate of the housing 231 with a drive unit 232 including a piezoelectric device and the like interposed therebetween. The components installed within and on the housing 231 constitute a laser engine 230. The controller 205 may also be installed within the housing 231 of the laser engine 230.

The housing 231 is provided with a moving mechanism (not depicted) for moving the housing 231 in the thickness direction of the object 1. This can move the laser engine 230 up and down according to the depth of the object 1, so as to change the position of the condenser optical system 204, thereby converging the laser light L at a desirable depth position of the object 1. The support table 201 may be provided with a moving mechanism for moving the support table 201 in the thickness direction of the object 1 instead of providing the housing 231 with the moving mechanism. An A/F unit 212 which will be explained later may be utilized for moving the condenser optical system 204 in the thickness direction of the object 1. They can also be combined.

The controller 205 controls not only the reflective spatial light modulator 203 but also the laser processing device 200 as a whole. For example, when fainting the modified region 7, the controller 205 controls the laser engine 230 including the condenser optical system 204 such that the converging point P of the laser light L relatively moves along the line 5 while being located at a predetermined distance from the front face (laser light entrance surface) 3 of the object 1. For moving the converging point P of the laser light L relative to the object 1, the controller 205 may control the support table 201 instead of or in addition to the laser engine 230 including the condenser optical system 204.

The laser light L emitted from the laser light source 202 is sequentially reflected by mirrors 206, 207 and a reflecting member 208 such as a prism within the housing 231, so as to be made incident on the reflective spatial light modulator 203. The laser light L incident on the reflective spatial light modulator 203 is modulated thereby and then emitted therefrom. Within the housing 231, the laser light L emitted from the reflective spatial light modulator 203 is reflected by the reflecting member 208 so as to travel along the optical axis of the condenser optical system 204 and then transmitted through beam splitters 209, 210 in sequence, so as to be made incident on the condenser optical system 204. The laser light L incident on the condenser optical system 204 is converged thereby into the object 1 mounted on the support table 201.

The laser processing device 200 also comprises within the housing 231 a surface observation unit 211 for observing the front face 3 of the object 1. The surface observation unit 211 emits visible light VL to be reflected by the beam splitter 209 and transmitted through the beam splitter 210 and detects the visible light VL reflected by the front face 3 of the object 1 after being converged by the condenser optical system 204, thereby acquiring an image of the front face 3 of the object 1.

The laser processing device 200 further comprises within the housing 231 the AF (autofocus) unit 212 for accurately placing the converging point P of the laser light L at a predetermined distance from the front face 3 even when there are undulations on the front face 3 of the object 1. The AF unit 212 emits AF laser light LB to be reflected by the beam splitter 210 and detects the AF laser light LB reflected by the front face 3 of the object 1 after being converged by the condenser optical system 204, so as to acquire displacement data of the front face 3 along the line 5 by using an astigmatic method, for example. Then, when forming the modified region 7, the AF unit 212 drives the drive unit 232 according to thus acquired displacement data, so as to move the condenser optical system 204 in its optical axis direction to and fro along the undulations of the front face 3 of the object 1, thereby finely adjusting the distance between the condenser optical system 204 and the object 1.

Figure 8:
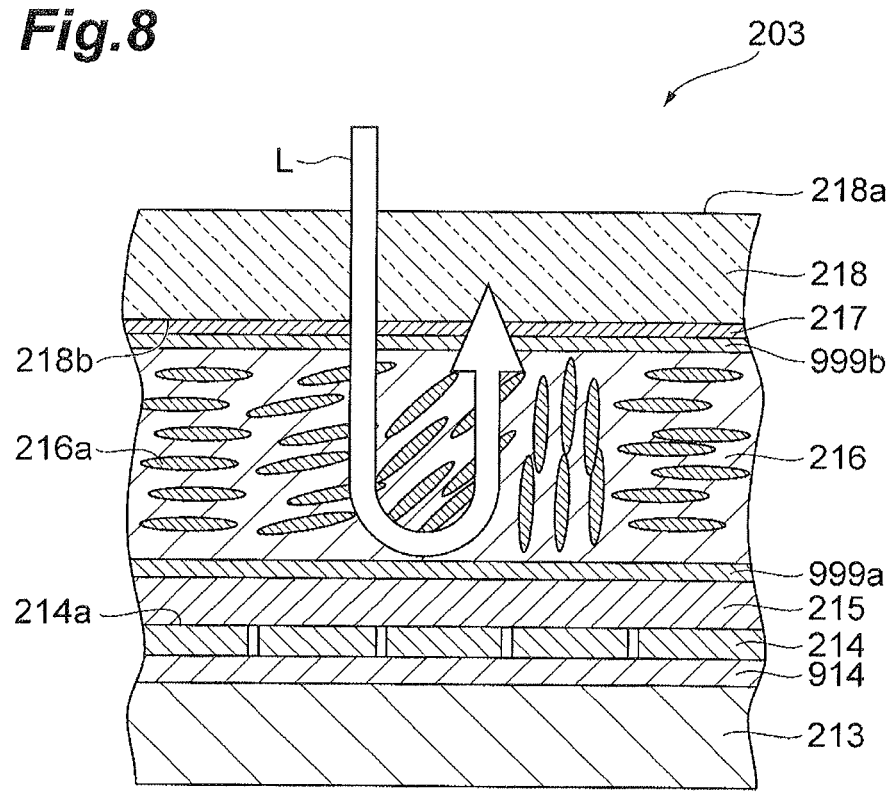
FIG. 8 is a partial sectional view of a reflective spatial light modulator in the laser processing device of FIG. 7.

The reflective spatial light modulator 203 will now be explained. The reflective spatial light modulator 203, for which a spatial light modulator (SLM) made of a liquid crystal on silicon (LCOS) is used, for example, corrects the aberration of the laser light L emitted from the laser light source 202. FIG. 8 is a partial sectional view of the reflective spatial light modulator in the laser processing device of FIG. 7. As FIG. 8 illustrates, the reflective spatial light modulator 203 comprises a silicon substrate 213, a drive circuit layer 914, a plurality of pixel electrodes 214, a reflecting film 215 such as a dielectric multilayer mirror, an alignment film 999a, a liquid crystal layer 216, an alignment film 999b, a transparent conductive film 217, and a transparent substrate 218 such as a glass substrate, which are stacked in this order.

The transparent substrate 218 has a front face 218a extending along an XY plane, while the front face 218a constitutes a front face of the reflective spatial light modulator 203. The transparent substrate 218 is mainly composed of a light-transmitting material such as glass, for example, and transmits therethrough the laser light L having a predetermined wavelength incident thereon from the front face 218a of the reflective spatial light modulator 203 to the inside of the latter. The transparent conductive film 217 is formed on a rear face 218b of the transparent substrate 218 and mainly composed of a conductive material (e.g., ITO) which transmits therethrough the laser light L.

The plurality of pixel electrodes 214 are arranged two-dimensionally according to the arrangement of a plurality of pixels on the silicon substrate 213 along the transparent conductive film 217. Each pixel electrode 214 is made of a metal material such as aluminum, for example, while its front face 214a is processed flat and smooth. The plurality of pixel electrodes 214 are driven by an active matrix circuit provided in the drive circuit layer 914.

The active matrix circuit is disposed between the plurality of pixel electrodes 214 and the silicon substrate 213 and controls the voltage applied to the pixel electrodes 214 according to a light image to be issued from the reflective spatial light modulator 203. An example of such an active matrix circuit has a first driver circuit for controlling pixel rows each aligning in the X direction and a second driver circuit for controlling pixel columns each aligning in the Y direction, which are not depicted, and is constructed such that the controller 205 applies a predetermined voltage to the pixel electrode 214 of a pixel designated by both of the driver circuits.

The alignment films 999a, 999b are arranged on both end faces of the liquid crystal layer 216, respectively, so as to align a group of liquid crystal molecules in a fixed direction. As the alignment films 999a, 999b, those made of a polymer material such as polyimide, whose surfaces coming into contact with the liquid crystal layer 216 have been subjected to rubbing, for example, are employed.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when the active matrix circuit applies a voltage to a given pixel electrode 214, an electric field is formed between the transparent conductive film 217 and this pixel electrode 214.

The electric field is applied to the reflecting film 215 and the liquid crystal layer 216 at a ratio of their respective thicknesses. The alignment direction of liquid crystal molecules 216a changes according to the magnitude of the electric field applied to the liquid crystal layer 216. The laser light L entering the liquid crystal layer 216 through the transparent substrate 218 and transparent conductive film 217, if any, is modulated by the liquid crystal molecules 216a while passing through the liquid crystal layer 216, then reflected by the reflecting film 215, and thereafter modulated again by the liquid crystal layer 216 before being taken out. Then, an aberration correction (wavefront shaping) pattern for shaping (modulating) the beam wavefront of the laser light L is displayed on the liquid crystal layer 216, whereby the laser light L transmitted through the aberration correction pattern of the liquid crystal layer 216 is phase-modulated according to the aberration correction pattern, so as to correct the aberration.

When forming the modified region 7, the controller 205 feeds the reflective spatial light modulator 203 with pattern information concerning the aberration correction pattern, so as to display a predetermined aberration correction pattern on the liquid crystal layer 216, thereby controlling the aberration of the laser light emitted from the reflective spatial light modulator 203. The reflective spatial light modulator 203 may be fed sequentially with the pattern information or selectively with pre-stored pattern information.

Meanwhile, in a strict sense, the laser light L having its aberration corrected by the reflective spatial light modulator 203 changes its wavefront form by propagating through a space. In particular, when the laser light L emitted from the reflective spatial light modulator 203 or incident on the condenser optical system 204 is light having a predetermined spread (e.g., light other than parallel light), the wavefront form at the reflective spatial light modulator 203 and that at the condenser optical system 204 may fail to coincide with each other, thereby obstructing the aimed precision internal processing. It is therefore important for the wavefront form at the reflective spatial light modulator 203 and that at the condenser optical system 204 to coincide with each other. To this end, it is more desirable to determine the change in the wavefront form of the laser light L at the time when it propagates from the reflective spatial light modulator 203 to the condenser optical system 204 by measurement or the like and feed the reflective spatial light modulator 203 with pattern information of the aberration correction pattern taking account of the change in the wavefront form.

Figure 9:
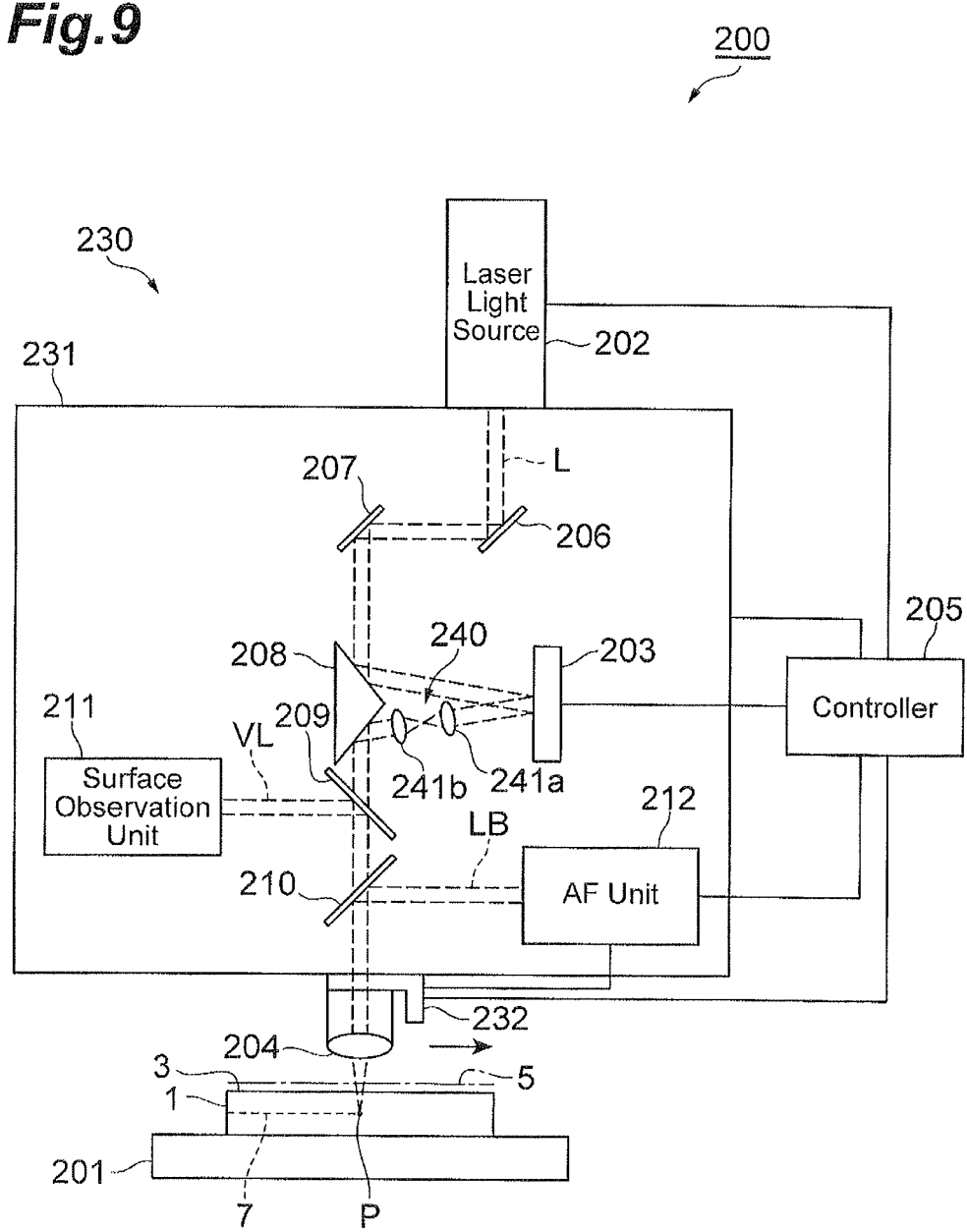
FIG. 9 is a schematic structural diagram of another laser processing device in accordance with the embodiment.

Alternatively, in order for the wavefront form at the reflective spatial light modulator 203 and that at the condenser optical system 204 to coincide with each other, an adjustment optical system 240 may be disposed on an optical path of the laser light L advancing between the reflective spatial light modulator 203 and the condenser optical system 204 as illustrated in FIG. 9. This can accurately achieve wavefront shaping.

The adjustment optical system 240 has at least two lenses 241a, 241b. The lenses 241a, 241b are used for making the wavefront form at the reflective spatial light modulator 203 and that at the condenser optical system 204 coincide with each other in terms of similarity. The lenses 241a, 241b are arranged between the reflective spatial light modulator 203 and the reflecting member 208 such that the distance between the reflective spatial light modulator 203 and the lens 241a becomes the focal length f1 of the lens 241a, the distance between the condenser optical system 204 and the lens 241b becomes the focal length f2 of the lens 241b, the distance between the lenses 241a, 241b becomes f1+f2, and the lenses 241a, 241b constitute a double telecentric optical system.

Such an arrangement can make the wavefront form at the reflective spatial light modulator 203 and that at the condenser optical system 204 coincide with each other even in the laser light L having a small spread angle of about 1° or less. The beam diameter of the laser light L is determined by the ratio between f1 and f2 (the beam diameter of the laser light L incident on the condenser optical system 204 is f2/f1 times that emitted from the reflective spatial light modulator 203). Therefore, whether the laser light L is parallel light or light having a small spread, it can attain a desirable beam diameter when incident on the condenser optical system 204, while keeping the angle by which it is emitted from the reflective spatial light modulator 203.

Preferably, the adjustment optical system 240 is equipped with a mechanism for minutely adjusting the positions of the lenses 241a, 241b independently from each other. For efficiently using an effective area of the reflective spatial light modulator 203, a beam expander may be disposed on the optical path of the laser light L between the laser light source 202 and the reflective spatial light modulator 203.

The laser processing method in accordance with this embodiment will now be explained.

Figure 10:
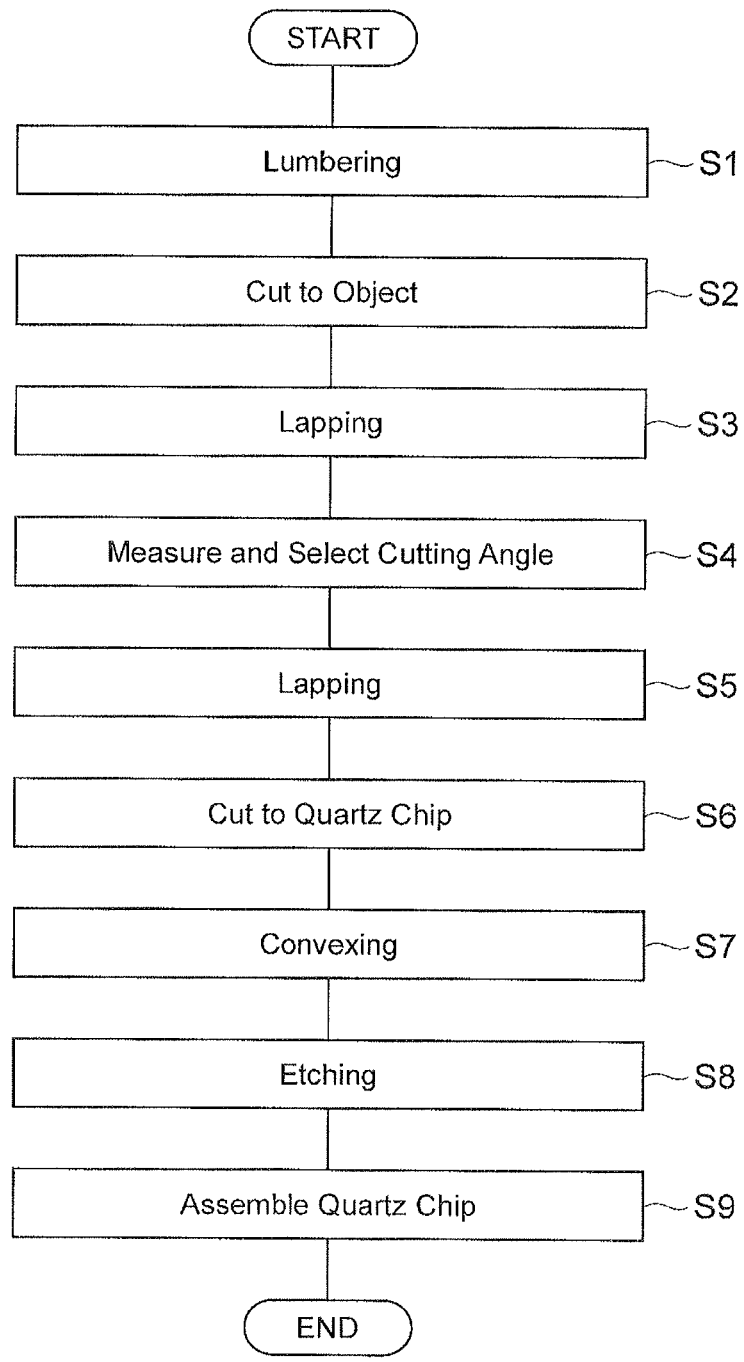
FIG. 10 is a flowchart illustrating a process of manufacturing a quartz oscillator in accordance with the embodiment.

The laser processing method in accordance with this embodiment is used as a quartz oscillator manufacturing method for manufacturing a quartz oscillator, for example, and lets the laser processing device 200 cut the object 1 formed from quartz, which is a hexagonal crystal, into a plurality of quartz chips. Therefore, a total manufacturing process flow of the quartz oscillator will firstly be explained in brief with reference to FIG. 10.

First, a synthetic quartz gemstone is cut out by grinding with diamond, for example, so as to be processed into a bar-shaped body (lumbered bar) having a predetermined size (S1). Subsequently, a cutting angle corresponding to a temperature characteristic required for the quartz oscillator is measured by X-rays, and the lumbered bar is cut according to the cutting angle by wire sawing into a plurality of wafer-shaped objects 1 (S2). Here, each object 1 is formed into a rectangular plate of 10 mm×10 mm and has a crystal axis tilted by 35.15° from the thickness direction.

Next, the front and rear faces 3, 21 of the object 1 are subjected to lapping until it attains a predetermined thickness (S3). Subsequently, the cutting angle is measured at a minute angle level by X-rays, so as to select and classify the object 1, and then the front and rear faces 3, 21 of the object 1 are subjected again to lapping similar to the above-mentioned S3, so as to minutely adjust the thickness of the object 1 to about 100 μm, for example (S4, S5).

Subsequently, as processing for cutting and outer shaping, the object 1 is formed with a modified region 7 and cut along the lines 5 from the modified region 7 acting as a cutting start point (S6, which will be explained later in detail). This produces a plurality of quartz chips having a dimensional accuracy of ± several μm or finer. In this embodiment, the lines 5 are set like grids on the object 1 when seen from above the front face 3, whereby the object 1 is cut into rectangular plate-like quartz chips each having a size of 1 mm×0.5 mm.

Next, the quartz chip is subjected to chamfering (convexing) so as to attain a predetermined frequency, and its thickness is also adjusted by etching so as to conform to the predetermined frequency (S7, S8). Thereafter, the quartz chip is assembled as a quartz oscillator (S9). Specifically, electrodes are formed on the quartz chip by sputtering, the quartz chip is mounted in a mounter and heat-treated in a vacuum, the electrodes on the quartz chip are thereafter shaved by ion etching so as to adjust the frequency, and then the inside of the mounter is sealed by seaming. This completes the manufacture of the quartz oscillator.

FIG. 11 is a set of schematic diagrams for explaining a process of cutting the object into the quartz chip. For convenience of explanation, these diagrams exemplify cutting along one line 5. At the above-mentioned S6 for cutting the object 1 into the quartz chip, the object 1 having an expandable tape 31 attached to the rear face 21 thereof is firstly mounted on the support table 201 (see FIG. 7).

Subsequently, the controller 205 controls the laser engine 230 and the reflective spatial light modulator 203, so as to converge the laser light L at the object 1 along the line 5 as appropriate, thereby forming the modified region 7 including a plurality of modified spots S (modified region formation process (modified region formation step)).

Specifically, as FIG. 11(*a*) illustrates, while irradiating the object 1 from the front face 3 side with an output of 0.03 W, a repetition frequency of 15 kHz, and a pulse width of 500 or 640 psec, the laser light L is relatively moved along the line 5, so as to form one row of a plurality of first modified spots $S_1$ which are located only within the object 1 (first scan).

Next, as FIG. 11(*b*) illustrates, while irradiating the object 1 from the front face 3 side with an output of 0.03 W, a repetition frequency of 15 kHz, and a pulse width of 500 or 640 psec, the laser light L is relatively moved along the line 5, so as to form one row of a plurality of second modified spots $S_2$ which are exposed at the front face 3 of the object 1 (second scan).

Here, it is seen that correcting the aberration of the laser light L such that the converging point is located near the front face 3 within the object 1 instead of simply converging the laser light L at the front face 3 in the above-mentioned second scan for forming the second modified spots $S_2$ exposed at the front face 3 serving as the laser light entrance surface can restrain the so-called airshot phenomenon (phenomenon in which no modified spot S is formed even when the laser light L is converged at the object 1) from occurring.

Therefore, in the above-mentioned second scan, the liquid crystal layer 216 of the reflective spatial light modulator 203 is caused to display a predetermined aberration correction pattern for correcting the aberration of the laser light L such that the converging point of the laser light L is located near the front face 3 within the object 1. At the same time, the focal point of the condenser optical system 204 is located at the front face 3 of the object 1. In this state, the object 1 is irradiated with the laser light L from the front face 3 side, namely, the laser light L whose aberration is corrected such as to locate the converging point near the front face 3 within the object 1 is converged at the front face 3 serving as the laser light entrance surface.

In the above-mentioned second scan, in particular, the liquid crystal layer 216 is caused to display the predetermined aberration correction pattern for locating the converging point at a position which is 1 to 2 μm inside of the front face 3 within the object 1, whereby the laser light L whose aberration is corrected such as to locate the converging point at a position which is 1 to 2 μm inside of the front face 3 within the object 1 is converged at the front face 3.

As FIG. 13 illustrates, this makes it possible to restrain the so-called airshot phenomenon from occurring and finely form only a plurality of modified spots $S_2$ exposed at the front face 3 (i.e., the modified region 7 intermittently exposed from the front face 3) continuously along the line 5 without producing a half-cut which is a fracture exposed at the front face 3.

The above-mentioned first and second scans are performed for all the lines 5, and then, as FIG. 12(*a*) illustrates, a knife edge 32 is pressed against the object 1 along the line 5 from the rear face 21 side with the expandable tape 31 interposed therebetween, so as to apply a force from the outside to the object 1 along the line 5 (cutting step).

This allows the plurality of first modified spots $S_1$ to serve as modified spots mainly contributing to cutting and the plurality of second modified spots $S_2$ to serve as modified spots which are surface dents for assisting the cutting, whereby the object 1 is cut into a plurality of quartz chips from the modified region 7 acting as a cutting start point. Then, as FIG. 12(*b*) illustrates, the expandable tape 31 is expanded, so as to secure a chip interval. The foregoing cuts the object 1 into a plurality of quartz chips 10.

In this embodiment, as in the foregoing, the laser light L is converged at the front face 3 of the object 1 while correcting the aberration of the laser light L such that the converging point of the laser light L is located near the front face 3 within the object 1, so as to form the second modified spots $S_2$ exposed at the front face 3. This can restrain the so-called airshot phenomenon from occurring, thereby making it possible to form the second modified spots $S_2$ accurately in the object 1.

Here, as mentioned above, the laser light L whose aberration is corrected such as to locate the converging point at a position 1 to 2 μm inside of the front face 3 is converged at the front face 3 of the object 1. This makes it possible to form the second modified spots $S_2$ accurately in the object 1 in particular when the object 1 is formed from quartz as in this embodiment.

Here, when forming the second modified spots $S_2$ exposed at the front face 3, the so-called airshot phenomenon is likely to occur in the case where the laser light L whose aberration is corrected such as to locate the converging point at a distance of less than 1 μm or more than 2 μm from the front face 3 within the object 1 is converged at the front face 3. Therefore, the processing quality deteriorates in such a case.

Figure 14:
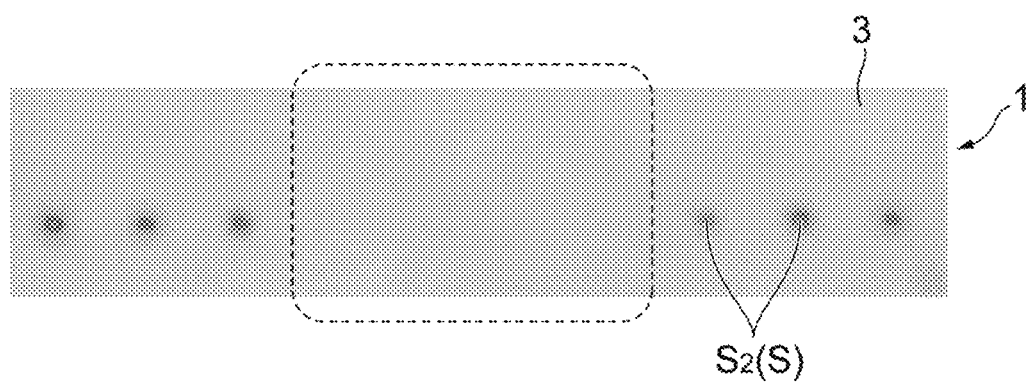
FIG. 14 is a photograph illustrating the front face of the object formed with second modified spots in accordance with a comparative example.

FIG. 14 is a photograph illustrating the front face of the object formed with the second modified spots in accordance with a comparative example. In this picture, the laser light L whose aberration is corrected such as to locate the converging point at a position which is 3 to 6 µm inside of the front face 3 within the object 1 is converged at the front face 3, so as to form the second modified spots $S_2$. As FIG. 14 illustrates, the airshot phenomenon is seen to occur in the case where the laser light L is converged at the front face 3 with its aberration corrected such that the converging point is located at a position which is deep from the front face 3 when forming the second modified spots $S_2$ exposed at the front face 3 (see the inside of the frame in the picture).

In this embodiment, as mentioned above, a plurality of first modified spots $S_1$ located within the object 1 are formed along the line 5, and so are a plurality of second modified spots $S_2$ exposed at the front face 3. Hence, the plurality of first modified spots $S_1$ make it easy for the object 1 to be cut along the line 5, and the plurality of second modified spots $S_2$ act as so-called perforations, so that the cutting is assisted by the plurality of second modified spots $S_2$. This makes it possible to cut the object 1 with high dimensional accuracy, thereby improving its processing quality.

If a half-cut occurs in the object 1 formed from quartz in particular, the dimensional accuracy of the object 1 will not be easy to control after cutting, since such a half-cut is likely to meander because of a processing characteristic of quartz, for example. In this regard, as mentioned above, this embodiment can perform such laser processing as to prevent the second modified spots $S_2$ from forming half-cuts, thereby making it possible to cut the object 1 with higher dimensional accuracy.

As mentioned above, this embodiment applies an external stress to the object 1 along the line 5 by using the knife edge 32, so as to cut the object 1 from the modified region 7 acting as a cutting start point. Hence, even the object 1 formed from quartz which is hard to cut can securely be cut along the line 5 with high accuracy.

Since the quartz oscillator is a device which utilizes a characteristic of a quartz material per se, its temperature and oscillator characteristics are greatly influenced by the dimensional accuracy of a quartz chip for the quartz oscillator. In this regard, this embodiment, which can cut the object 1 with high dimensional accuracy as the quartz chip, is effective in particular. Even when the second modified spots $S_2$ remain on (are exposed at) the front face 3, the temperature and oscillator characteristics of the quartz chip are not influenced much thereby. Simply raising the processing point output is unfavorable in that it is not only hard to restrain the airshot phenomenon from occurring but also easy to produce scorches and damages on the front face 3.

Though a preferred embodiment of the present invention is explained in the foregoing, the present invention is not limited to the above-mentioned embodiment but may be modified or applied to others within the scope not altering the gist set forth in each claim.

For example, while the LCOS-SLM is used as the reflective spatial light modulator 203 in the above-mentioned embodiment, a MEMS-SLM, a DMD (deformable mirror device), or the like may be used. The reflective spatial light modulator 203 in the above-mentioned embodiment is equipped with a dielectric multilayer mirror but may utilize reflections of pixel electrodes of a silicon substrate instead. Transmissive spatial light modulators may be used in place of the reflective spatial light modulator 203 in the above-mentioned embodiment. Examples of the spatial light modulator include those of liquid crystal cell and LCD types.

While the above-mentioned embodiment forms the modified region 7 by producing the first modified spots $S_1$ at a predetermined depth within the object 1, it is not restrictive, whereby the first modified spots $S_1$ (i.e., the modified region located only within the object 1) may not be formed.

While the above-mentioned embodiment forms the second modified spots $S_2$ after the first modified spots $S_1$, the first modified spots $S_1$ may be formed after the second modified spots $S_2$. When forming the object 1 with a plurality of rows of modified regions 7 at positions in the thickness direction different from each other, the modified regions 7 may be formed in any order.

In the foregoing, values concerning the aberration correction can tolerate errors in processing, manufacture, design, and the like. The present invention, which can be regarded as a quartz oscillator manufacturing method or device for manufacturing a quartz oscillator by the above-mentioned laser processing method, is not limited to those for manufacturing quartz oscillators, but is also applicable to various methods or devices for forming modified regions including a plurality of modified spots in objects to be processed.

INDUSTRIAL APPLICABILITY

The present invention can accurately form the modified spot in the object.

REFERENCE SIGNS LIST

1 . . . object to be processed; 5 . . . line to cut; 7 . . . modified region; 100, 200 . . . laser processing device; 101, 202 . . . laser light source; 102 . . . laser light source controller (control unit); 105 . . . condenser lens (condenser optical system); 107, 201 . . . support table; 203 . . . reflective spatial light modulator (spatial light modulator); 204 . . . condenser optical system; 205 . . . controller (control unit); L . . . laser light; S . . . modified spot; $S_2$ . . . second modified spot (modified spot)

The invention claimed is:

1. A laser processing method for forming a modified region including an exposed indentation in a laser light incident surface of an object to be processed by converging a laser light outside of the laser light incident surface of the object, the method comprising:
   loading an aberration correction pattern for display by a spatial light modulator;
   displaying the aberration correction pattern by the spatial light modulator;
   directing laser light toward the spatial light modulator;
   modulating the laser light according to the displayed aberration correction pattern; and
   converging the modulated laser light with a converging point of the modulated laser light being located outside of the laser light incident surface of the object, thereby forming an exposed indentation in the laser light incident surface of the object;
   wherein:
   (i) the aberration correction pattern displayed by the spatial light modulator is a pattern that is configured to correct an aberration that would cause the laser light to be converged inside the laser light incident surface of the object, at a position below the laser light incident surface of the object, if the laser light were not modulated according to the displayed aberration correction pattern; and
   (ii) a condenser lens converges the laser light that has been modulated by the displayed aberration correction pattern with the converging point of the modulated laser light being located outside of the laser light incident surface of the object, thereby forming the exposed indentation in the laser light incident surface of the object.

2. A laser processing method according to claim 1, wherein the object is formed from quartz; and
wherein the position below the laser light incident surface of the object is a position located 1 to 2 μm inside of the laser light incident surface in the object.

3. A laser processing method according to claim 1, further comprising forming a plurality of exposed indentations in the laser light incident surface of the object by performing at least the converging step multiple times along a cutting line, wherein the forming of the exposed indentations involves relatively moving the modulated laser light along the cutting line while irradiating the object with the modulated laser light.

4. A laser processing method according to claim 3, further comprising a cutting step of cutting the object along the cutting line using the modified region as a cutting start point.

5. A laser processing device for forming a modified region including exposed indentation in a laser light incident surface of an object to be processed by converging a laser light outside of the laser light incident surface of the object, the device comprising:
  a laser light source for oscillating the laser light in a pulsating manner;
  a spatial light modulator for displaying an aberration correction pattern loaded onto the spatial light modulator and modulating the oscillated laser light according to the displayed aberration correction pattern;
  a condenser optical system for converging the modulated laser light outside of the laser light incident surface of the object while the object is supported on a support table; and
  a control unit for controlling at least the laser light source and the spatial light modulator, wherein the control unit executes a process of forming an exposed indentation in the laser light incident surface of the object by converging the modulated laser light outside of the laser light incident surface of the object;
wherein:
(i) the aberration correction pattern displayed by the spatial light modulator is a pattern that is configured to correct an aberration that would cause the laser light to be converged inside the laser light incident surface of the object, at a position below the laser light incident surface of the object, if the laser light were not modulated according to the displayed aberration correction pattern; and
(ii) the condenser optical system comprises a condenser lens that converges the laser light that has been modulated by the displayed aberration correction pattern with the converging point of the modulated laser light being located outside of the laser light incident surface of the object, thereby forming the exposed indentation in the laser light incident surface of the object.

6. A laser processing device according to claim 5, wherein the process executed by the control unit comprises forming a plurality of exposed indentations in the laser light incident surface of the object by performing at least the converging multiple times along a cutting line, wherein the forming of the exposed indentations involves relatively moving the modulated laser light along the cutting line while irradiating the object with the modulated laser light.

7. A laser processing device according to claim 6, wherein the process executed by the control unit comprises a cutting step of cutting the object along the cutting line using the modified region as a cutting start point.

* * * * *